United States Patent [19]
Crowe et al.

[11] 3,770,499
[45] Oct. 6, 1973

[54] LIQUID PHASE DEPOSITION OF THIN INSULATING AND REFRACTORY FILM ON A SUBSTRATE

[75] Inventors: William J. Crowe; Kim Ritchie, both of Phoenix; Harold S. Gurev, Scottsdale, all of Ariz.

[73] Assignee: Motorola, Inc., Franklin Park, Ill.

[22] Filed: Feb. 28, 1972

[21] Appl. No.: 230,071

Related U.S. Application Data

[63] Continuation-in-part of Ser. No. 99,969, Dec. 21, 1970, abandoned.

[52] U.S. Cl. ............... 117/221, 117/101, 117/47 R, 117/200, 117/201, 117/213
[51] Int. Cl. ........................... B44d 1/02, B44d 1/20
[58] Field of Search .................... 117/200, 201, 221, 117/106 R, 106 A, 213, 101, 47 R

[56] References Cited

UNITED STATES PATENTS

| | | | |
|---|---|---|---|
| 2,904,452 | 9/1959 | Reichelt | 117/106 R |
| 3,427,195 | 2/1969 | Chesnot | 117/200 |

OTHER PUBLICATIONS

Kalish, Zirconium & Zirconium Alloys, American Society for Metals, Cleveland, Ohio (1953) pg. 7–9.

*Primary Examiner*—Alfred L. Leavitt
*Assistant Examiner*—M. F. Esposito
*Attorney*—Foorman L. Mueller et al.

[57] ABSTRACT

It is known to deposit zirconium dioxide, $ZrO_2$, on a substrate comprising a chip or wafer by providing zirconium oxychloride, $ZrOCl_2$, vapor at about 550° C, the chip or wafer being at 450° C, in an atmosphere containing water vapor. Zirconium dioxide, $ZrO_2$, and hydrochloric acid, HCl, are produced and a layer of the $ZrO_2$ is deposited on the chip. The $ZrO_2$ layer acts as a passivation material having high resistivity and very good impermeability to sodium which can be destructive of the circuit on the chip or wafer. According to this invention, the $ZrO_2$ may be deposited on a substrate at a lower temperature from a liquid solution of the zirconium oxychloride, whereby the substrate may be paper or plastic and whereby the substrate if it includes a circuit will not be injured by the temperature needed by the prior art high temperature treatment, and therefore the possible injury to the substrate or to the circuit therein by the prior art high temperature treatment is avoided.

13 Claims, 1 Drawing Figure

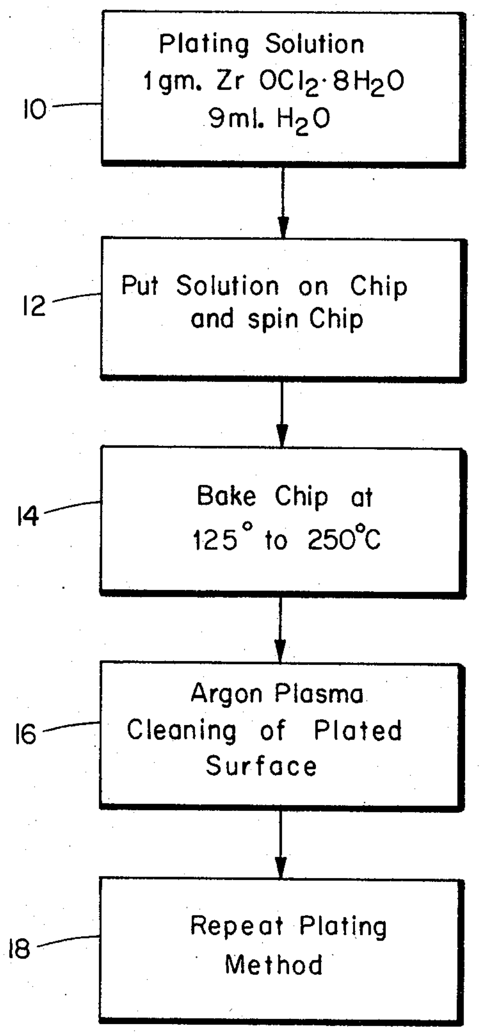
INVENTOR.
William J. Crowe
BY Harold S. Gurev
Kim Ritchie
Mueller & Aichele
ATTY'S.

LIQUID PHASE DEPOSITION OF THIN INSULATING AND REFRACTORY FILM ON A SUBSTRATE

BACKGROUND

This is a continuation in part of Ser. No. 99,969, filed Dec. 21, 1970 now abandoned.

The invention relates to deposition on a base or substrate material of a film or layer of zirconium dioxide, $ZrO_2$.

A thin layer of zirconium dioxide, $ZrO_2$, has high resistance, not quite as high as the resistance of the thin layer of $SiO_2$, but considerably higher than the resistance of a thin layer of silicon nitride, $Si_3N_4$. Furthermore, zirconium dioxide is much more impermeable to sodium ions, which can cause instabilities in semiconductor devices, than silicon dioxide and it is as impermeable to sodium ions as is silicon nitride. Therefore, a thin layer of zirconium dioxide is a good passivation material for semiconductive devices. A preferred form of semiconductive device is a monocrystalline silicon wafer within which active and passive devices have been formed.

A high temperature method is known for depositing a zirconium dioxide film or layer on a substrate from a vapor phase of zirconium oxychloride, $ZrOCl_2$. The $ZrOCl_2$ is held at about 550° C, the substrate being held about 450° C in a water vapor atmosphere, producing zirconium dioxide which deposits on the substrate, HCl vapor also being evolved. The high temperatures involved in this process may injure the substrate or circuit element deposited thereon. Furthermore, the known process is very critical in that it is difficult to cause it to operate in a desired manner.

It is an object of this invention to provide an improved method of depositing zirconium dioxide on a substrate.

It is a further object of this invention to provide a method of depositing zirconium dioxide on a substrate that involves lower temperatures than the known method.

It is a still further object of this invention to provide a method of depositing zirconium dioxide on a monocrystalline silicon wafer at temperatures within the range of 125° to 250° C.

SUMMARY

In accordance with the invention, a solution of zirconium oxychloride comprising $ZrOCl_2 \cdot 8H_2O$ in water is put on a substrate to be coated and the water which may be at room temperature is driven off as by spinning or mild heating or both. The Hydrated water is driven off by the heating and the $ZrOCl_2$ which remains is converted to $ZrO_2$ in one or two steps, leaving a coating or layer or film of $ZrO_2$ on the substrate. If commercial $ZrOCl_2$ is used, the impure film of $ZrO_2$ on the substrate which results may act as a voltage responsive switch. If it is desired to add successive layers of $ZrO_2$ on the first layer thereof, the film may be cleaned by argon plasma cleaning and the process of deposition may be repeated.

DESCRIPTION

The invention will be better understood upon reading the following description together with the accompanying drawing which illustrates steps of the inventive method.

In accordance with the invention, up to about 1 gram of $ZrOCl_2 \cdot 8H_2O$ is dissolved in 9 milliliters of water to produce the plating mixture 10. The mixture is put on the surface of the substrate to be coated and the substrate is spun in a known manner to cover the surface of the substrate, as indicated by the rectangle 12. The spinning of materials onto wafers is well known in the semiconductor processing art. A preferred form of wafer is a monocrystalline wafer or chip. The solution can also be applied by spraying, dipping or by other methods. The spinning on of the mixture gives a uniform coating of the mixture over the surface of the substrate to be coated. To assist in wetting the surface of the substrate, a small amount of a low boiling point alcohol such as ethanol may be added to the solution before it is put on the substrate or the substrate may be cleaned as by argon plasma cleaning before the solution is put thereon or both techniques may be used.

At this point two alternative continuations of the disclosed method appear. According to the first alternative, the substrate, with the solution thereon, is heated in the range of 125°–250° C to drive off the hydrated water and leave a solid layer of $ZrOCl_2$ on the substrate. Then, the heating is continued at a temperature between 125° C to about 250° C in an atmosphere containing water vapor and the $ZrOCl_2$ becomes $ZrO_2$ through a chemical reaction with the HCl being driven off. According to the second alternative, the substrate is heated in the range of 125°–250° C in a dry atmosphere and the $ZrOCl_2$ on the chip becomes $ZrO_2$ through a chemical reaction with HCl being driven off. With either method a highly resistive $ZrO_2$ coating that is highly impermeable to sodium ions is produced on the substrate.

As noted above, the addition of the low boiling point alcohol and the argon plasma cleaning of the substrate surface for the production of the first layer of $ZrO_2$ is optional. The coating action takes place without the ethanol or the argon plasma cleaning, however the use of ethanol and the cleaning or either thereof results in better coverage of the substrate.

It has been found that upon using commercially pure $ZrOCl_2$, the produced film may have impurities such as chlorine therein. The film may act as a voltage responsive switch in that, if a high voltage is applied across the otherwise highly resistive film, the resistance of the film drops greatly. Such films have been baked up to 900°C to densify them but the switching property persists.

A single layer of $ZrO_2$ may be about 500 to 1,000 angstrom units thick. This layer may be thick enough to produce the voltage responsive switch but not thick enough to act as a passivation layer. If it is desired to build up several layers of $ZrO_2$, the previous layers are cleaned using the known argon plasma method. Then the deposition process is repeated for each additional layer of $ZrO_2$. As many layers of $ZrO_2$ may be produced in this manner as is desired.

It has been found that if more than about 1 gram of $ZrOCl_2 \cdot 8H_2O$ is dissolved in about 9 milliliters of $H_2O$, the $ZrO_2$ film is not formed by the method disclosed above in that the $ZrO_2$ is deposited as separate, thick, crystalline patches on the substrate.

What is claimed is:

1. A low temperature method of depositing a layer of $ZrO_2$ on a surface, comprising the steps of:

providing a substrate having a surface to be coated with $ZrO_2$;

spreading a mixture of up to substantially 1 gram $ZrOCl_2 \cdot 8H_2O$ dissolved in substantially 9 milliliters of water on said surface to uniformly coat the surface as desired; and heating the coated substrate to a temperature within the range of 125° C to about 250° C until the hydrated water of the $ZrOCl_2 \cdot 8H_2O$ is driven off and the $ZrOCl_2$ has changed to $ZrO_2$.

2. The method of claim 1 and further including the step of:

adding ethanol to the mixture for increasing the wetting of the mixture with the surface of the substrate.

3. The method of claim 1 and further including the step of:

cleaning the surface of the substrate with argon plasma prior to spreading the mixture on the surface.

4. The method of claim 1 and further including the step of:

cleaning the deposited layer of $ZrO_2$ with argon plasma; and repeating the steps to form a second layer of $ZrO_2$.

5. The method of claim 1 wherein said heating step further comprises:

heating said coated substrate to a temperature lying within the range of 125° C to about 250° C in a dry atmosphere for driving the water of hydration out of the $ZrOCl_2 \cdot 8H_2O$ and to change the $ZrOCl_2$ to $ZrO_2$.

6. The method of claim 5 and further including the step of:

cleaning the deposited layer of $ZrO_2$ by argon plasma cleaning; and repeating the steps to form a second layer of $ZrO_2$ on the cleaned $ZrO_2$ layer.

7. A low temperature method of depositing a layer of $ZrO_2$ on a surface, comprising the steps of:

providing a substrate having a surface to be coated with $ZrO_2$;

spreading a mixture of up to substantially 1 gram of $ZrOCl_2 \cdot 8H_2O$ dissolved in substantially 9 milliliters of water on the surface to uniformly coat the surface as desired;

heating the coated substrate to a temperature lying within the range of 125° to 250° C until the hydrated water of $ZrOCl_2 \cdot 8H_2O$ is driven off; and continue heating the coated substrate to a temperature lying within the range of 125° to 250° C in an atmosphere containing water vapor until the $ZrOCl_2$ has changed to $ZrO_2$.

8. The method of claim 7 and further including the step of:

cleaning the deposited layer of $ZrO_2$ by argon plasma cleaning; and repeating the steps to form a second layer of $ZrO_2$.

9. A low temperature method of depositing a layer of $ZrO_2$ on a surface comprising the steps of:

providing a silicon substrate having a surface to be coated with $ZrO_2$;

forming a mixture by dissolving up to about 1 gram of $ZrOCl_2 \cdot 8H_2O$ in about 9 milliliters of water;

adding ethanol to the mixture for increasing the wetting of the mixture with the surface of the substrate;

spreading the mixture on the substrate to uniformly coat the surface as desired; and heating the coated substrate to a temperature within the range of 125° C to about 250° C until the hydrated water of the $ZrOCl_2 \cdot 8H_2O$ is driven off and the $ZrOCl_2$ has changed to $ZrO_2$.

10. The method of claim 1 and further including the step of:

cleaning the surface of the substrate with argon plasma prior to spreading the mixture on the surface.

11. The invention of claim 1 and further including the step of:

cleaning the deposited layer of $ZrO_2$ with argon plasma; and repeating the steps to form a second layer of $ZrO_2$.

12. A low temperature method of depositing a layer of $ZrO_2$ on a surface, comprising the steps of:

providing a silicon substrate having a surface to be coated with $ZrO_2$;

forming a mixture by dissolving up to substantially one gram of $ZrOCl_2 \cdot 8H_2O$ in substantially 9 milliliters of water;

adding ethanol to the mixture for increasing the wetting of the mixture with the surface of the substrate;

placing a quantity of the mixture on the silicon substrate and spinning the substrate to uniformly coat the surface as desired;

heating the coated substrate to a temperature lying within the range of 125° C to about 250° C in a dry atmosphere for driving the water of hydration out of the $ZrOCl_2 \cdot 8H_2O$ and for changing the $ZrOCl_2$ to $ZrO_2$.

13. A low temperature method of depositing a layer of $ZrO_2$ on a surface, comprising the steps of:

providing a silicon substrate having a surface to be coated with $ZrO_2$;

forming a mixture by dissolving up to substantially one gram of $ZrOCl_2 \cdot 8H_2O$ in substantially 9 milliliters of water;

adding ethanol to the mixture for increasing the wetting of the mixture with the surface of the substrate;

placing a quantity of the mixture on the silicon substrate and spinning the substrate to uniformly coat the surface as desired;

heating the coated substrate to a temperature lying within the range of 125°to about 250° C until the hydrated water of the $ZrOCl_2 \cdot 8H_2O$ is driven off; and continue heating the coated substrate to a temperature lying within the range of 125° TO 250° C in an atmosphere containing sufficient water vapor until the $ZrOCl_2$ has changed to $ZrO_2$.

* * * * *